(12) United States Patent
Morita et al.

(10) Patent No.: US 8,478,552 B2
(45) Date of Patent: Jul. 2, 2013

(54) MONITOR OF ASSEMBLED BATTERY

(75) Inventors: Tsuyoshi Morita, Zama (JP); Takuya Kinoshita, Yokosuka (JP); Atsushi Kawase, Sagamihara (JP); Noriko Hoshino, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 317 days.

(21) Appl. No.: 12/918,192

(22) PCT Filed: Feb. 24, 2009

(86) PCT No.: PCT/JP2009/053250
§ 371 (c)(1),
(2), (4) Date: Aug. 18, 2010

(87) PCT Pub. No.: WO2009/107597
PCT Pub. Date: Sep. 3, 2009

(65) Prior Publication Data
US 2011/0004429 A1    Jan. 6, 2011

(30) Foreign Application Priority Data

Feb. 29, 2008  (JP) ................................. 2008-050849
Feb. 29, 2008  (JP) ................................. 2008-050850

(51) Int. Cl.
*G01R 31/36* (2006.01)

(52) U.S. Cl.
USPC .................. 702/63; 702/64; 702/65; 702/127

(58) Field of Classification Search
USPC ....... 702/63–65, 127; 324/434, 444; 320/107, 320/116
See application file for complete search history.

(56) References Cited

U.S. PATENT DOCUMENTS 7,528,579 B2 * 5/2009 Pacholok et al. ............. 320/145
8,058,842 B2 * 11/2011 Kai et al. ...................... 320/116

FOREIGN PATENT DOCUMENTS

| JP | 8-339829 A | 12/1996 |
| JP | 11-318033 A | 11/1999 |
| JP | 2000-106158 A | 4/2000 |
| JP | 2000-156242 A | 6/2000 |
| JP | 2001-201522 A | 7/2001 |
| JP | 2004-170335 A | 6/2004 |
| JP | 2004-304991 A | 10/2004 |

* cited by examiner

*Primary Examiner* — Eliseo Ramos-Feliciano
*Assistant Examiner* — Elias Desta
(74) *Attorney, Agent, or Firm* — Foley & Lardner LLP (57) ABSTRACT

A monitor (5) monitors an assembled battery (1) having a plurality of cells (11) and a power supply line (2) for connecting the plurality of the cells (11). The monitor (5) includes: a detecting portion (6) for detecting a voltage of each of the cells (11) of the plurality of the cells (11); and a controlling portion (7) for receiving a voltage detection result detected by the detecting portion (6). The detecting portion (6) converts the voltage detection result into an alternating current communication signal and transmits the alternating current communication signal via the power supply line (2) to the controlling portion (7).

14 Claims, 10 Drawing Sheets

CUT

WELDED TO UNIT CELL

MONITOR OF ASSEMBLED BATTERY

TECHNICAL FIELD

The present invention relates to a monitor of an assembled battery connected with a plurality of cells.

Moreover, the present invention relates to a cell having an electric circuit element for detecting voltage of one cell or voltages of a plurality of cells.

BACKGROUND ART

In an assembled battery formed by connecting a plurality of cells in a form of at least one of a serial connection and a parallel connection, a monitor for monitoring the remaining capacity by detecting the voltage of each of the cells is known.

[Patent Literature 1] Japanese Patent Application Laid-Open No. 1996 (Heisei 8)-339829 (=JP8339829)

Moreover, in an assembled battery formed by connecting a plurality of unit cells in a form of at least one of a serial connection and a parallel connection, protective circuits for protecting the cell's overcharge and overdischarge are fitted to one integrated circuit board by the gross and such integrated circuit board is stored in a battery case together with the assembled battery.

[Patent Literature 2] Japanese Patent Application Laid-Open No. 2000-106158 (=JP2000106158)

DISCLOSURE OF INVENTION

However, via a special communication wire to a battery controller, the conventional monitor of the assembled battery according to the Japanese Patent Application Laid-Open No. 1996 (Heisei 8)-339829 transmits the voltage detected per cell. Therefore, it is necessary to pull out and handle the communication-oriented signal line per cell.

Moreover, the conventional assembled battery according to the Japanese Patent Application Laid-Open No. 2000-106158 has such an inconvenience that the battery case becomes larger by an amount equivalent to a storing space of the circuit board where the protective circuits are integrated.

In view of the above, it is an object of the present invention to provide a monitor of an assembled battery which monitor is capable of monitoring cells without the need of a special communication-oriented signal line.

Moreover, it is another object of the present invention to provide a cell capable of making a storing space small.

According to a first aspect of the present invention, there is provided a monitor for monitoring an assembled battery having a plurality of cells and a power supply line for connecting the plurality of the cells. The monitor comprises: a detecting portion for detecting a voltage of each of the cells of the plurality of the cells; and a controlling portion for receiving a voltage detection result detected by the detecting portion. The detecting portion converts the voltage detection result into an alternating current communication signal and transmits the alternating current communication signal via the power supply line to the controlling portion.

According to a second aspect of the present invention, there is provided a method for monitoring an assembled battery having a plurality of cells and a power supply line for connecting the plurality of the cells. The method comprises: detecting a voltage of each of the cells of the plurality of the cells; and receiving a voltage detection result detected by a detecting operation. The detecting operation converts the voltage detection result into an alternating current communication signal and transmits the alternating current communication signal via the power supply line for a receiving operation.

According to a third aspect of the present invention, there is provided a monitor for monitoring an assembled battery having a plurality of cells and a power supplying means for connecting the plurality of the cells. The monitor comprises: a detecting means for detecting a voltage of each of the cells of the plurality of the cells; and a controlling means for receiving a voltage detection result detected by the detecting means. The detecting means converts the voltage detection result into an alternating current communication signal and transmits the alternating current communication signal via the power supplying means to the controlling means.

BEST MODE FOR CARRYING OUT THE INVENTION (First Embodiment)

Hereinafter, the first embodiment of the present invention is to be set forth in detail, according to the drawings.

<<Embodiment of Monitor>>

Figure 1:
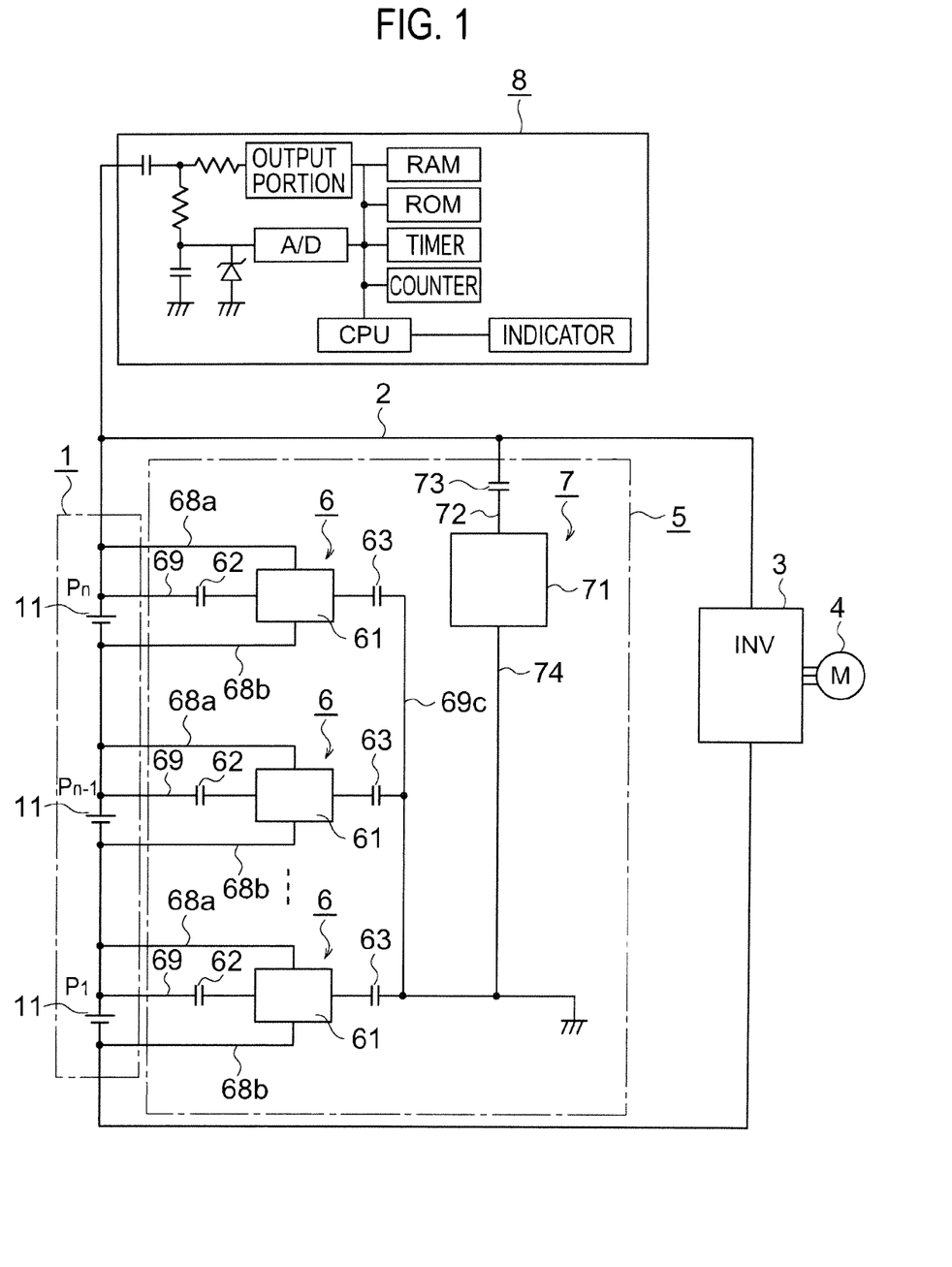
FIG. 1 is a lock diagram showing an assembled battery provided with a monitor, according to the first embodiment of the present invention.

FIG. 1 is a block diagram showing a motor 4's driving system by an assembled battery 1 provided with a monitor 5, according to the first embodiment of the present invention. In the assembled battery 1 shown in FIG. 1, a plurality of cells 11 are connected in series and an inverter 3 is connected to both poles of the assembled battery 1 via a power supply line 2. A direct current supplied from the assembled battery 1 is converted into an alternating current by means of the inverter 3 as a power converter and then is supplied to an alternating current motor 4, to thereby drive the alternating current motor 4.

In addition, the motor 4's driving system by the assembled battery 1 is an example for explaining the monitor 5 according to the first embodiment. Other than the structure of the assembled battery 1 where the plurality of cells 11 are connected in series, the assembled battery 1 may be so structured that the cells 11 are connected in a form of at least one of a serial connection and a parallel connection. Moreover, in the case that an object for supplying power by the assembled battery 1 is a direct current motor, the inverter 3 can be omitted. In addition, the object for supplying power may be a load other than the motor 4.

The monitor 5 according to the first embodiment has a voltage detector circuit 6 for detecting a terminal-to-terminal voltage of each cell 11, and a control circuit 7 for implementing a total control for preventing the overcharge and overdischarge by taking in the voltage of each cell 11 detected by the voltage detector circuit 6 and then by obtaining capacity of the assembled battery 1. The voltage detector circuit 6 according to the first embodiment corresponds to the detecting portion of the present invention while the control circuit 7 according to the first embodiment corresponds to the controlling portion of the present invention.

Moreover, the voltage detector circuit 6 according to the first embodiment is so structured as to detect the terminal-to-terminal voltage of one cell 11 by means of one voltage detector circuit 6. However, the voltage detector circuit 6 according to the first embodiment may be so structured that several cells 11 are grouped and the voltage detector circuit 6 detects the voltages of such grouped cells 11.

Based on a detection instruction signal from the control circuit 7, the voltage detector circuit 6 according to the first embodiment detects the terminal-to-terminal voltage of the corresponding one cell 11 and transmits, to the control circuit 7, a communication signal corresponding to the thus detected voltage. Moreover, based on a discharge instruction signal from the control circuit 7, the voltage detector circuit 6 according to the first embodiment consumes the power of the corresponding cell 11 and solves the capacity variation between the cells 11 included in the assembled battery 1.

Especially, by using the power supply line 2, the monitor 5 according to the first embodiment transmits and receives the control instruction between the voltage detector circuit 6 and the control circuit 7 and a communication signal which corresponds to the detected voltage. Moreover, since a direct current flows the power supply line 2, the above communication signal is rendered an alternating current for distinction from the direct current. Wirings 68a, 68b shown in FIG. 1 detect the terminal-to-terminal voltage of the cell 11 and wirings 69, 72 are each a communication-oriented connector portion for transmitting and receiving the signal between the voltage detector circuit 6 and the control circuit 7.

Figure 2:
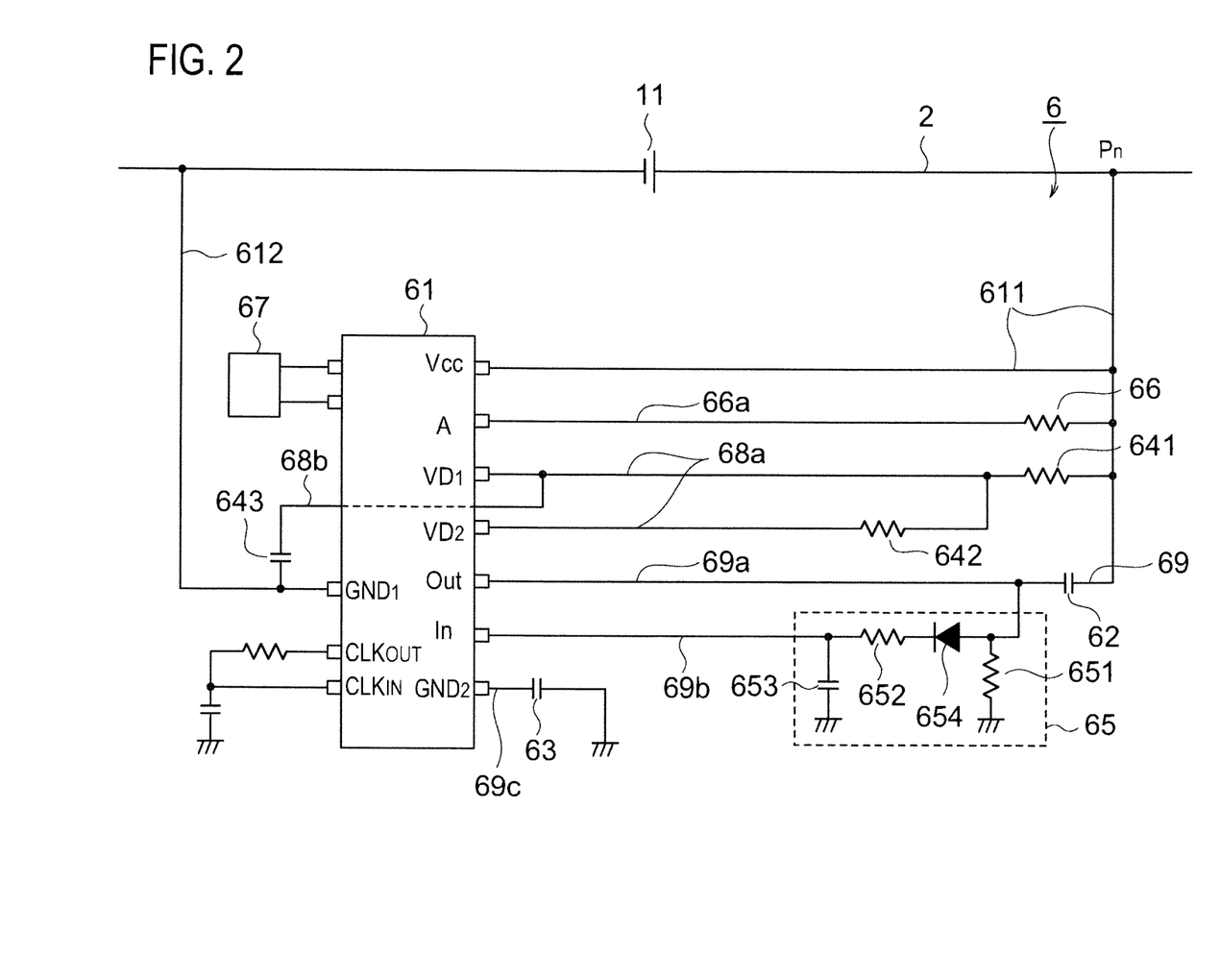
FIG. 2 is an electric circuit showing a detector of the monitor, according to the first embodiment of the present invention.

In this respect, a specific structure of the voltage detector circuit 6 is to be set forth more in detail. FIG. 2 is an electric circuit diagram showing the voltage detector circuit 6, according to the first embodiment.

As shown in FIG. 2, the voltage detector circuit 6 has a wiring 611 connected to a positive electrode terminal (positive electrode tab 112 to be described afterward) of the cell 11 and a wiring 612 connected to a negative electrode terminal (negative electrode tab 113 to be described afterward) of the cell 11. The wiring 611 is connected to a power input terminal Vcc of a microprocessor unit 61 (hereinafter referred to as "MPU 61" for short), while the wiring 612 is connected to a ground terminal GND1 of the MPU 61. With this, a driving power is supplied to the MPU 61.

Then, the wirings 68a, 68a connected to the positive electrode terminal of the cell 11 in parallel are respectively provided with resistors 641, 642 for detecting the voltage of the cell 11. The other ends of the wirings 68a, 68a are respectively connected with voltage detection terminals VD1, VD2 of the MPU 61. Moreover, a condenser 643 is connected to the wiring 68b electrically connected to the negative electrode terminal of the cell 11. The other end of the wiring 68b is connected to the wiring 68a connected to the voltage detection terminal VD1. These two resistors 641, 642 and the condenser 643 detect the terminal-to-terminal voltage of the cell 11.

The detected terminal-to-terminal voltage of the cell 11 is converted into an alternating current signal of a specific frequency range by means of an internal function of the MPU 61 and is sent from an after-described communication signal output terminal Out to the control circuit 7 via the wirings 69a, 69, 611 and power supply line 2. In this case, for determining a reference voltage Va of the alternating current communication signal, a wiring 69c is connected to a communication signal-oriented ground terminal GND2 of the MPU 61. Via a coupling condenser 63, the communication signal-oriented ground terminal GND2 is connected to a ground point such as a battery case for storing the assembled battery 1 according to the first embodiment. In each of the cells 11, the ground point such as the battery case is identical in potential (common potential). Therefore, the reference potential Va of the alternating current communication signal sent out from the communication signal output terminal Out to the control circuit 7 is equal at any of the voltage detector circuits 6.

On the other hand, the wiring 69 is connected in parallel with the wiring 611 connected to the positive electrode terminal of the cell 11, and the wiring 69 is provided with a coupling condenser 62. Moreover, the wiring 69 on the other side of the coupling condenser 62 is divided in parallel into the two wirings 69a, 69b. The wiring 69a is connected to the communication signal output terminal Out of the MPU 61, and the wiring 69b is connected to a communication signal input terminal In of the MPU 61.

Figure 3:
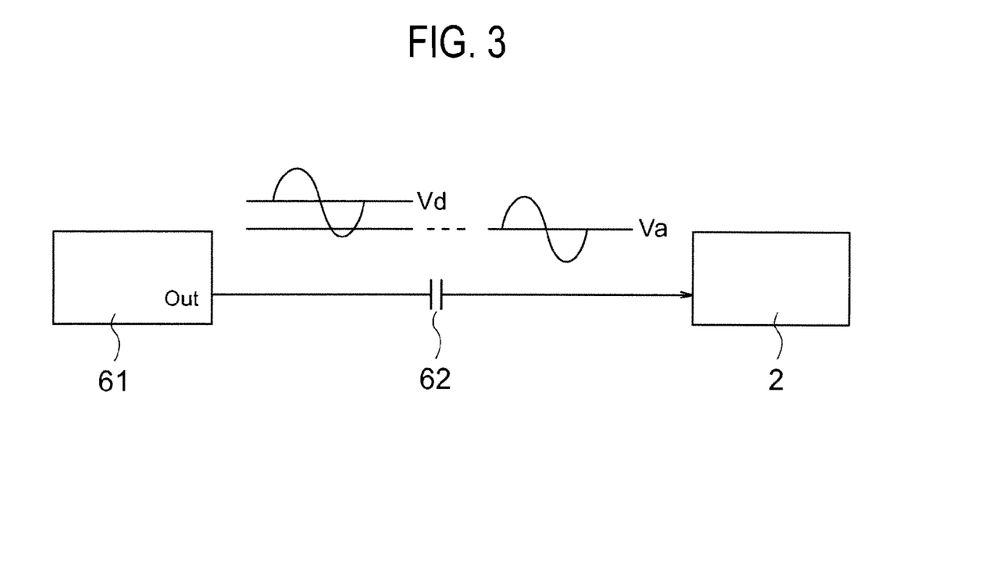
FIG. 3 is a drawing for explaining a communication method of the monitor, according to the first embodiment of the present invention.

Herein, as shown in FIG. 3, together with a direct current having a potential Vd which corresponds to the position of the assembled battery 1 connected with the cell 11, the alternating current communication signal outputted from the communication signal output terminal Out of the MPU 61 generates a mixed signal. That is, with respect to the assembled battery 1 shown in FIG. 1, the first potential at a point P1 of the cell 11 where the point P1 is disposed in a position close to the negative electrode terminal (after-described negative electrode tab 113) is lower (by a voltage of the cells 11 connected between the above point P1 and the following point Pn) than the nth potential at a point Pn of the cell 11 where the point Pn is disposed in a position {a position close to the positive electrode terminal (after-described positive electrode tab 112) of the assembled battery 1} further from the negative electrode terminal (after-described negative electrode tab 113) of the assembled battery 1. With this, the reference potential of the alternating current communication signal varies with the cell 11. Therefore, it is difficult for the control circuit 7 to recognize the alternating current communication signal even when the alternating current communication signal is flown in the cell 11. In addition, FIG. 3 explains a communication method (output side) according to the first embodiment, showing a pattern diagram for explaining the function of the coupling condenser 62.

According to the first embodiment, the coupling condenser 62 is disposed at the wiring 69 between the communication signal output terminal Out (of the MPU 61) and the power supply line 2, thereby allowing a communication by using the power supply line 2. That is, by shutting off the direct current component, the coupling condenser 62 (coupling condenser 63 as well) has a function to allow only the alternating current component to pass through. Therefore, as shown in FIG. 3, the mixed signal including the direct current (of potential Vd) and the alternating current communication signal has its direct current component removed when passing through the coupling condenser 62, leaving only the alternating current communication signal of the reference potential Va. Then, the alternating current communication signal of the reference potential Va is sent out to the power supply line 2. With this, regardless of the position of disposing the cell 11 in the assembled battery 1, the alternating current communication signal of the identical potential is sent out to the power supply line 2 from the voltage detector circuit 6 of each of the cells 11, thus making it possible for the control circuit 7 to recognize the communication signal.

Back to FIG. 2, the wiring 69b connected to the communication signal input terminal In of the MPU 61 is provided with the resistors 651, 652 and condenser 653 which three are included in a band pass filter 65. The band pass filter 65 is a filter circuit having both of a high pass filter HPF for extracting only a high frequency range signal by removing a low frequency range noise and a low pass filter LPF for extracting only a low frequency range signal by removing the high frequency range noise. In addition, FIG. 2 shows a diode 654 for rectification.

The band pass filter 65 according to the first embodiment is a filter circuit for extracting, from various signals (noises) flowing in the power supply line 2, a specific frequency range signal for making a communication between the voltage detector circuit 6 and the control circuit 7.

Figure 4:
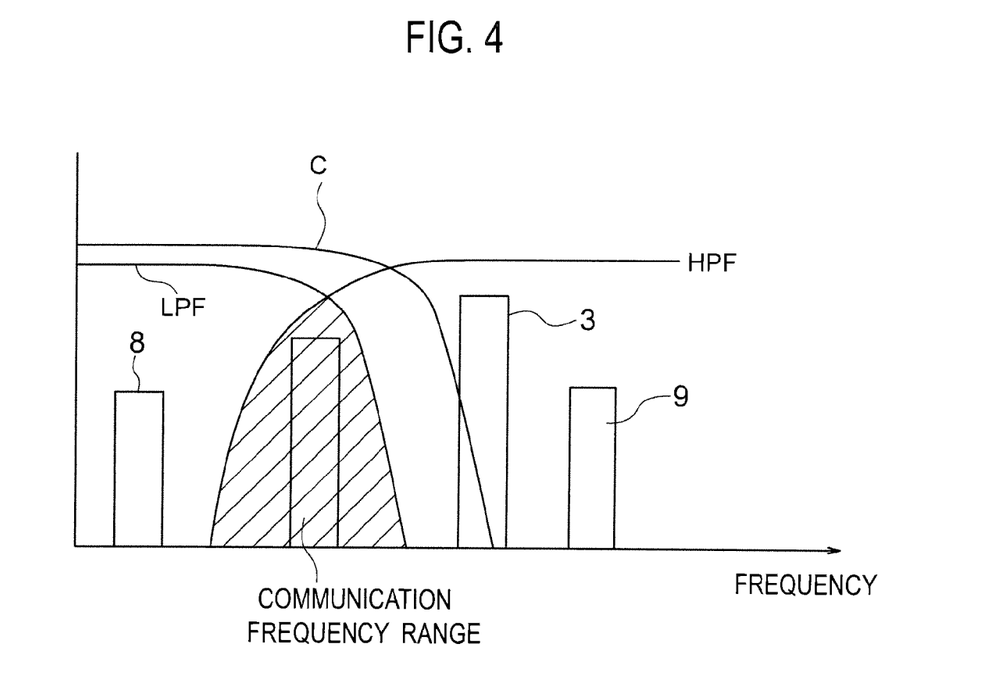
FIG. 4 is a drawing for explaining a communication frequency range of the monitor, according to the first embodiment of the present invention.

FIG. 4 is a drawing for explaining the communication frequency range used for the monitor 5 according to the first embodiment. With respect to the communication method according to the first embodiment, the alternating current communication signal is flown in the power supply line 2, therefore, the usable frequency range is the one that can pass through the cell 11. Though being variable according to structure of the cell 11, this frequency range is denoted by a reference sign C in FIG. 4. Moreover, the frequency range C should not overlap with the frequency range of other alternating current signals flowing in the power supply line 2.

For example, alternating current signals from a ground fault detector 8 (refer to FIG. 1. For a specific structure, refer to Japanese Patent Application Laid-Open No. 2003-250201.) for detecting a ground fault condition of the assembled battery 1, the inverter 3 and a DC/DC converter 9 (though denoted in FIG. 4, schematics of the ground fault detector 8, inverter 3, and DC/DC converter 9 are not shown) are mixed with the signal of the power supply line 2. When the frequency ranges of the alternating current signals respectively caused from the inverter 3 and the DC/DC converter 9 fall within the ranges shown in FIG. 4, the frequency range (denoted by slanting lines in FIG. 4) between the ground fault, detector 8 and the inverter 3 has a room relatively. Therefore, the frequency range (denoted by slanting lines in FIG. 4) is used for the communication signal between the voltage detector circuit 6 and the control circuit 7.

Moreover, according to the first embodiment, using the high pass filter HPF for removing the noise from the ground fault detector 8 and the low pass filter LPF for removing the noise from the inverter 3 extracts only the slanting line frequency range signal from the signal inputted via the power supply line 2 and the wirings 611, 69, 69b. The thus extracted signal is inputted to the communication signal input terminal In of the MPU 61. In addition, at the MPU 61, the alternating current communication signal outputted from the communication signal output terminal Out of the MPU 61 is generated as the slanting line frequency range signal.

Figure 5:
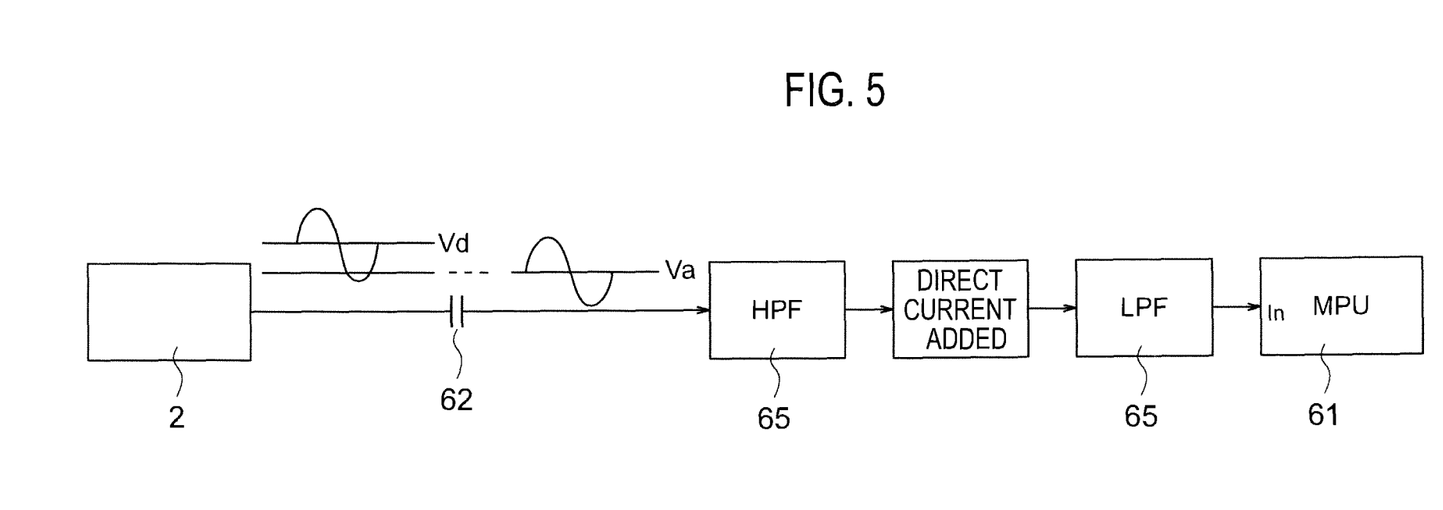
FIG. 5 is a drawing for explaining a communication method of the monitor, according to the first embodiment of the present invention.

FIG. 5 is a drawing for explaining a communication method (input side) according to the first embodiment, showing a pattern diagram of the processes of extracting the alternating current communication signal using the band pass filter 65. The alternating current communication signal transmitted via the power supply line 2 has its direct current component shut off by means of the coupling condenser 62 and then becomes an alternating current communication signal of the reference potential Va. The band pass filter 65 having the high pass filter HPF and the low pass filter LPF extracts only the alternating current communication signal of the specific frequency region (slanting line frequency region in FIG. 4). In this case, the direct current potential of the corresponding cell 11 is connected to the ground terminal GND1. Based on this direct current potential, the MPU 61 recognizes the alternating current communication signal. Therefore, the direct current potential of the corresponding cell 11 is added to the alternating current communication signal extracted by the band pass filter 65. Then, this added signal is sent out to the communication signal input terminal In of the MPU 61.

In addition, according to the first embodiment, the frequency range between the ground fault detector 8 and the inverter 3 is determined as a communication-oriented frequency range (the slanting line frequency range in FIG. 4). However, another frequency range can be set as the communication-oriented frequency range according to the system to which the assembled battery 1 is applied, provided that such another frequency range is capable of passing through the cell 11.

Moreover, according to the first embodiment, for making an information communication between the voltage detector circuit 6 and the control circuit 7, the communication signal output terminal Out and communication signal input terminal In of the MPU 61 are connected on the positive electrode side (right side of MPU 61 in FIG. 2) of the cell 11. On the other hand, it is allowed that the communication signal output terminal Out and communication signal input terminal In of the MPU 61 are connected to the negative electrode side (left side of MPU 61 in FIG. 2) of the cell 11 and that transmitting-receiving of the communication signal is implemented from the negative electrode side.

Back to FIG. 2, the wiring 66a is connected in parallel with the wiring 611 connected to the positive electrode terminal (after-described positive electrode tab 112) of the cell 11. A capacity adjusting resistor 66 is provided for the wiring 66a. Then, the other end of the wiring 66a is connected to a capacity adjusting terminal A of the MPU 61. Based on the instruction signal from the control circuit 7, the capacity adjusting terminal A and the ground terminal GND1 are turned on for a certain period, to thereby flow the current from the cell 11 to the capacity adjusting resistor 66, thus adjusting the cell 11's capacity at a certain amount.

Moreover, a memory 67 including a nonvolatile semiconductor memory and the like and memorizing (storing) an inherent identifier of the to-be-detected cell 11 (object cell 11) is provided for each of the voltage detector circuits 6. When the detected voltage is outputted after being converted to an alternating current signal, the inherent identifier stored in the memory 67 is added as a header of the alternating current signal and then is sent to the control circuit 7. With this, the control circuit 7 can recognize to which cell 11 the information concerning the voltage value thus sent corresponds. In addition, the identifier of the to-be-detected cell 11 is also added to a capacity adjustment instruction signal sent from the control circuit 7. The capacity adjustment instruction signal added by the inherent identifier of the to-be-detected cell 11 and the inherent identifier memorized in the memory 67 in the voltage detector circuit 6 are compared, to thereby determine whether or not the capacity adjusting instruction is directed to self.

Back to FIG. 1, the control circuit 7 has a microprocessor unit 71 (hereinafter referred to as "MPU 71" for short), a wiring 72 for connecting the MPU's communication signal output terminal and communication signal input terminal to the power supply line 2, a wiring 74 for connecting the MPU 71's communication signal-oriented ground terminal to a ground point such as a battery case for storing therein the cell 1 according to the first embodiment, and a coupling condenser 73 disposed at the wiring 72.

By taking in the terminal-to-terminal voltage (of each of the cells 11) detected by the voltage detector circuit 6, the MPU 71 holds the capacity of the assembled battery 1, to thereby implement an overall control for preventing the overcharge and overdischarge. For this purpose, the instruction signal for detecting the voltage of the cell 11 is sent out to each of the voltage detector circuits 6. This instruction signal is, as set forth referring to FIG. 4, generated as the alternating current communication signal of the specific frequency range (slanting line frequency range in FIG. 4). Then, the coupling condenser 73 disposed at the wiring 72 shuts off the direct current component, to thereby send out the instruction signal to the power supply line 2 as the alternating current communication signal of the reference potential Va which is the same as the reference potential Va of the voltage detector circuit 6.

The voltage of each of the cells 11 is sent out from the corresponding voltage detector circuit 6. The MPU 71 reads in the alternating current communication signal corresponding to the thus sent out voltage. Then, the MPU 71 analyzes the voltage together with the inherent identifier included in the thus read-in alternating current communication signal, that is, the inherent identifier of the cell 11. Then, in the case that the capacity of the cell 11 has a difference with a certain threshold or over, the MPU 71 sends out an instruction signal to the voltage detector circuit 6 which corresponds to the above object cell 11, and flows the current to the capacity adjusting resistor 66 for a certain time. With this, the MPU 71 makes, for example, such a control that the capacities of the cells 11 included in the assembled battery 1 are equal. The capacity adjustment instruction signal outputted in this operation is added by the inherent identifier of the object cell 11 (capacity adjustment). The capacity adjustment instruction signal added by the inherent identifier of the object cell 11 (capacity adjustment) is compared with the inherent identifier stored in the memory 67 in each of the voltage detector circuits 6, to thereby determine whether or not the capacity adjustment instruction is directed to self.

In addition, since the voltage detector circuit 6 is provided with the coupling condensers 62, 63, the coupling condenser 73 of the control circuit 7 may be omitted.

As set forth above, the monitor 5 according to the first embodiment implements the transmitting-receiving of the information between the voltage detector circuit 6 and the control circuit 7 via the power supply line 2, to thereby eliminate the need of the special information communication-oriented wiring conventionally needed, thus decreasing cost of the wiring per se, assembling man hour for handling the wiring and wiring space.

Moreover, even when the direct current potentials of the alternating current communication signal sent out from the voltage detector circuit 6 are different, the coupling condenser 63 equates the reference potentials Va and the alternating current communication signal is sent out to the power supply line 2 via the coupling condenser 62, thus bringing about an alternating current communication signal of an identical potential.

Moreover, even when the signals with various frequency ranges are included in the alternating current communication signals received via the power supply line 2, the band pass filter 65 is used for extracting the alternating current communication signal of the specific frequency range, thus allowing the communication between the voltage detector circuit 6 and the control circuit 7.

Moreover, when the communication between the voltage detector circuit 6 and the control circuit 7 is implemented, the inherent identifier of the cell 11 is added to the alternating current communication signal, thus specifying the voltage detector circuit 6 of the object cell 11 from a plurality of the voltage detector circuits 6.

<<Embodiment of Voltage Detector Circuit>>

By the way, it is enough that the voltage detector circuit 6 is connected to the positive electrode terminal and negative electrode terminal of each cell 11. In other words, it is not necessary to pull out the wirings from a plurality of voltage detector circuits 6 and connect the respective wirings to the control circuit 7. Therefore, as an example of the monitor 5 according to the first embodiment, using the following flexible circuit board 600 included in the voltage detector circuit 6 can more effectively omit the pulling-out or handling of the wiring.

Figure 6:
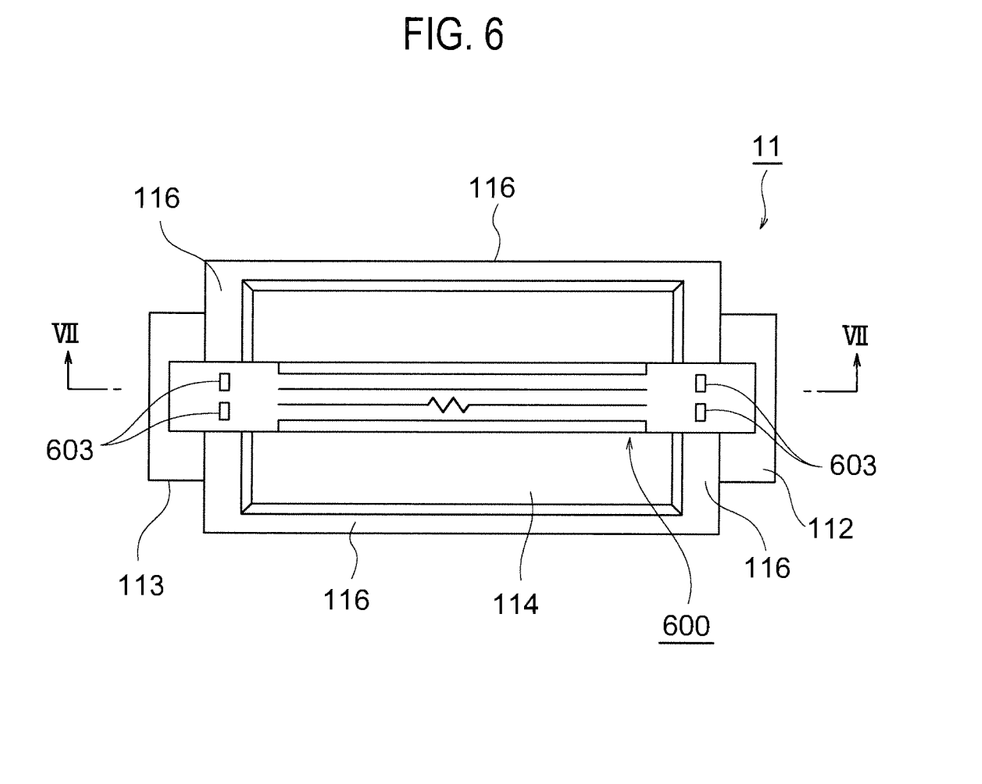
FIG. 6 is a plan view showing a cell, according to the first embodiment of the present invention.
Figure 7:
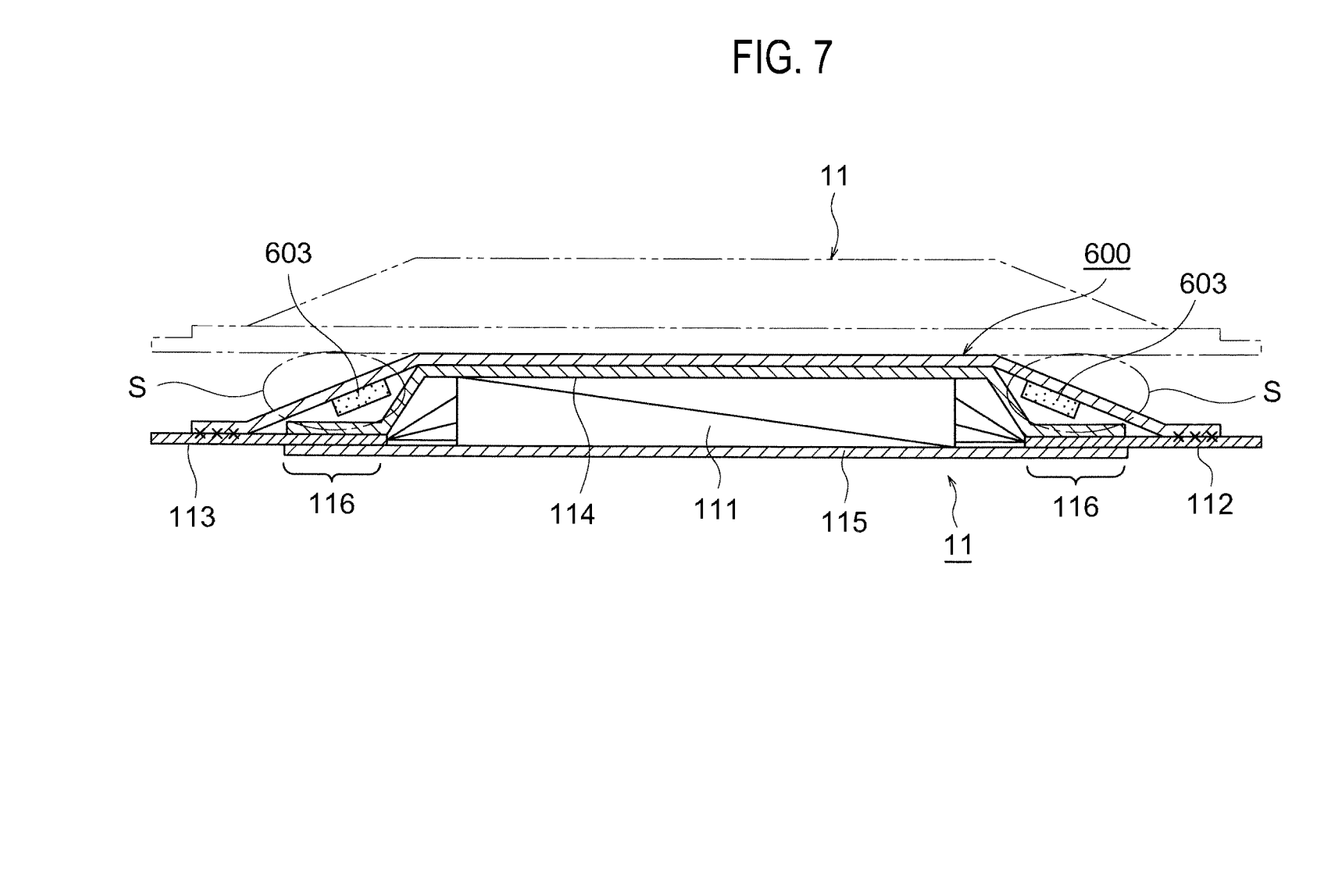
FIG. 7 is a lateral cross sectional view showing the cell, according to the first embodiment of the present invention.

FIG. 6 is a plan view showing the cell 11 according to the first embodiment, and FIG. 7 is a lateral cross sectional view (cross sectional view taken along the line VII-VII in FIG. 6) showing the same cell 11 according to the first embodiment.

The cell 11 according to the first embodiment is a lithium flat secondary battery. The cell 11 includes a generator element 111, a positive electrode tab 112 as a positive electrode terminal, a negative electrode tab 113 as a negative electrode terminal, an upper outer member 114 and a lower outer member 115.

Though detailed drawings are to be omitted, the generator element 111 is made by alternately stacking a positive electrode plate connected to the positive electrode tab 112 and coated with a positive active material and a negative electrode plate connected to the negative electrode tab 113 and coated with a negative electrode material, where the above alternate stacking is done via an insulative separator.

The upper outer member 114 and the lower outer member 115 are each made by laminating the first face (an inner face of the cell 11) of a metal foil such as aluminum foil with a resin such as polyethylene, modified polyethylene, polypropylene, modified polypropylene, ionomer and the like and by laminating the second face (an outer face of the cell 11) with a polyamide resin or a polyester rein. The upper outer member 114 and the lower outer member 115 each have flexibility.

According to the first embodiment, as shown in FIG. 7, the upper outer member 114 is formed in a form of a dent which corresponds to a thickness of the generator element 111, meanwhile the lower outer member 115 is formed in a form of a flat plate. In addition, both of the upper outer member 114 and the lower outer member 115 may otherwise be formed into a dent. Still otherwise, forming the upper outer member 114 into a flat plate while forming of the lower outer member 115 into a dent are also allowed. Then, the upper outer member 114 and the lower outer member 115 wrap the generator element 111, a part of the positive electrode tab 112 and a part of the negative electrode tab 113. Then, in a space formed by the upper outer member 114 and lower outer member 115, a liquid electrolyte having, as a solute, lithium salts such as lithium perchlorate, lithium borofluoride, lithium hexafluorophosphate is injected into an organic liquid solvent. Then, this space is sucked, to thereby bring about a vacuum state. Then, an entire periphery of an outer peripheral end portion of each of the upper outer member 114 and the lower outer member 115 is subjected to a thermal fusion bonding by means of a heat press and then is sealed. A portion formed by joining the upper outer member 114 and the lower outer member 115 through the thermal fusion bonding is referred to as a joint portion 116.

Figure 8:
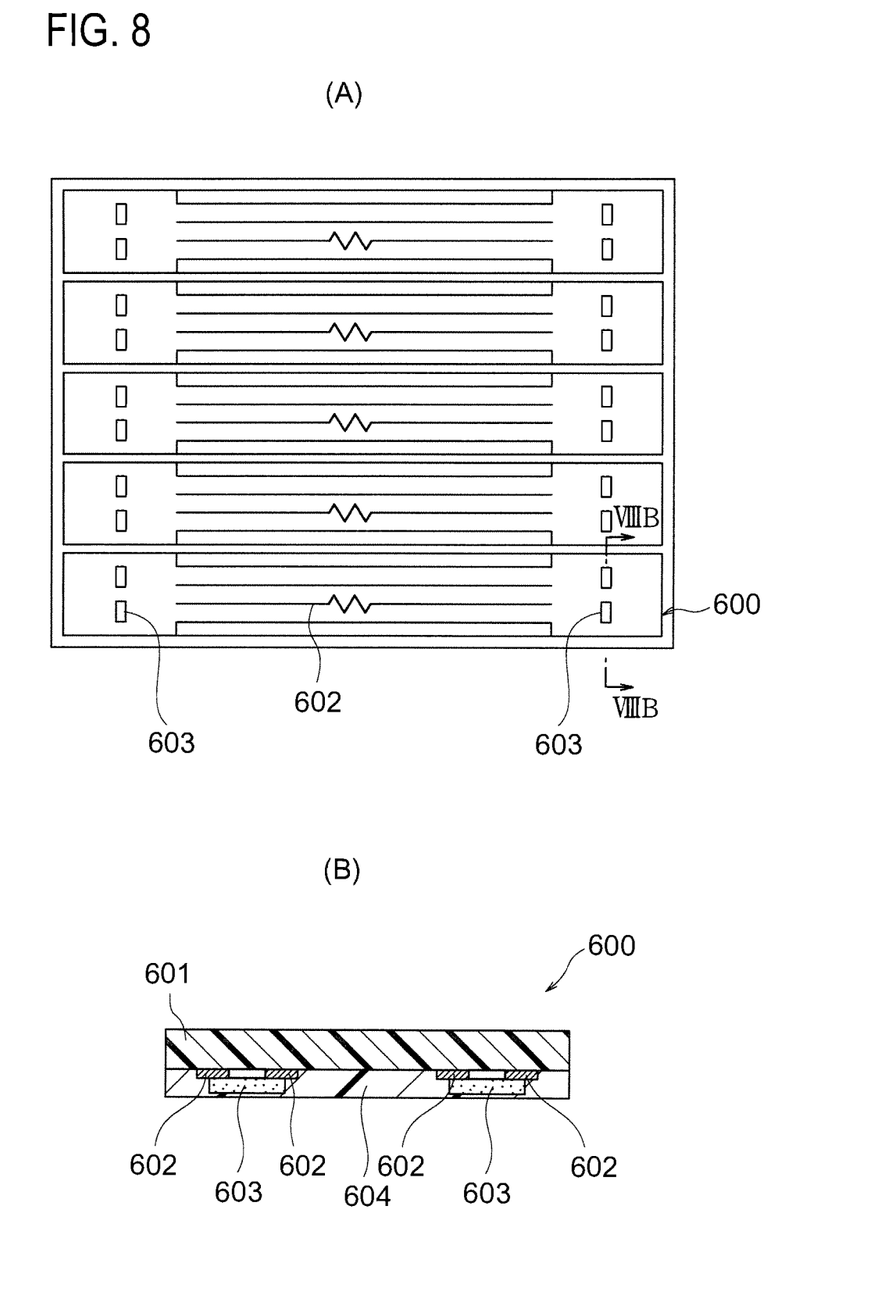
FIG. 8 is a plan view and a cross sectional view showing a flexible circuit board, according to the first embodiment of the present invention.

FIG. 8A and FIG. 8B each show the flexible circuit board 600 according to the first embodiment, where FIG. 8A is a plan view, FIG. 8B is a cross sectional view taken along the line VIIIB-VIIIB. In addition, FIG. 8A is a plan view showing a state before cutting into one flexible circuit board 600.

Each of the upper outer member 114 and the lower outer member 115 according to the first embodiment corresponds to an outer member of the present invention, while each of the positive electrode tab 112 and the negative electrode tab 113 according to the first embodiment corresponds to the cell terminal of the present invention, that is, the positive electrode terminal and negative electrode terminal.

The flexible circuit board 600 according to the first embodiment is, as shown in the cross sectional view of FIG. 8B, formed in the following operations: on an insulative sheet 601 such as polyimide resin substrate, a wiring pattern 602 including a resistor is patterned by a conductive material such as copper; then, circuit elements (electronic parts) 603 such as IC chip (MPU 61), coupling condensers 62, 63, condenser 653, diode 654 and the like are fitted to a certain position. Moreover, for securing insulation of the wiring pattern 602 and circuit element 603, the surface of each of the wiring pattern 602 and circuit element 603 is coated with an insulative protective film 604.

In addition, FIG. 8A shows pattern diagrams of the wiring pattern 602 (including the resistor) and electronic part 603. Practically, according to the structure of the voltage detector circuit 6 shown in FIG. 2, the wiring pattern 602 (including the resistor), the IC chip (MPU 61) of the MPU 61, the coupling condensers 62, 63 and the diode 654 are positioned by a proper layout.

The flexible circuit board 600 according to the first embodiment has such a structure that the entirety of the board is rectangular. As shown in FIG. 6, the length in the longitudinal direction of the flexible circuit board 600 is so formed as to correspond to a distance between the positive electrode tab 112 and the negative electrode tab 113. Forming the flexible circuit board 600 rectangular can improve yield of the original sheet, as shown in FIG. 8A. Moreover, the flexible circuit board 600 formed rectangular can be cut with ease by using a punch.

Moreover, in FIG. 2, the wiring 611's wiring pattern (connector portion with the positive electrode tab 112) connected to the positive electrode side is formed at the first end portion of the flexible circuit board 600, while the wiring 612's wiring pattern (connector portion with the negative electrode tab 113) connected to the negative electrode side is formed at the second end portion of the flexible circuit board 600. Then, the wiring pattern shown in FIG. 2 is formed between the first end portion and the second end portion.

With this, as shown in FIG. 6 and FIG. 7, the flexible circuit board 600 is superposed on the upper outer member 114 of the cell 11 and joined with the upper outer member 114, such that the first end portion and second end portion of the flexible circuit board 600 are electrically connected respectively with the positive electrode tab 112 and negative electrode tab 113. With this, of the thickness of the flexible circuit board 600, only a portion other than the thickness of the circuit elements 603 is increased. Then, the voltage detector circuit 6 can be integrated with the cell 11.

On the other hand, the circuit elements 603 such as the MPU 61, coupling condensers 62, 63, memory 67, condensers 643, 653, and diode 654 each have a thickness larger than that of the flexible circuit board 600 per se. With this, the circuit elements 603 each having the above large thickness are provided in a space S of the joint portion 116 of the cell 11, as shown in FIG. 7.

That is, as shown in FIG. 2, when the flexible circuit board 600 is fitted to the cell 11, the circuit elements 603 are fitted on the flexible circuit board 600 in such a configuration as to be positioned at the joint portion 116 between the upper outer member 114 and the lower outer member 115. Among the circuit elements 603, the IC chip of the MPU 61 is the largest, therefore, such a large circuit element 603 has priority to the layout.

With respect to the electric circuit example shown in FIG. 2, the seven circuit elements 603 including the MPU 61, coupling condensers 62, 63, memory 67 condensers 643, 653 and diode 654 (eight, when a condenser of a clock circuit is included) are disposed at the joint portion 116 between the upper outer member 114 and the lower outer member 115.

In addition, when making a layout of the circuit elements 603 on the flexible circuit board 600, the following points should be taken into account.

That is, of the voltage detector circuits 6 shown in FIG. 2, an analogue circuit is likely to be influenced by noise. Therefore, the resistors 651, 652, condenser 653 and diode 654 which are included in the band pass filter 65 for removing the noise are to be disposed in a position close to the positive electrode tab 112 which implements transmitting-receiving of the alternating current communication signal. According to the first embodiment, an input-output terminal of the communication signal is connected to the positive electrode side of the cell 11, thereby disposing the band pass filter 65 in a position as close to the positive electrode tab 112 as possible can shorten an area which may be influenced by the noise.

On the other hand, the MPU 61 and the memory 67 which are each relatively less likely to be influenced by the noise may be, if necessary, disposed in any positions including the positive electrode side and negative electrode side. In the case that the band pass filter 65 disposed on the positive electrode side and thereby decreasing a space on the positive electrode side in connection with the layout of the flexible circuit board 600, the MPU 61 and the memory 67 may be disposed on the negative electrode side. Especially, for increasing the yield of the original sheet by forming the flexible circuit board 600 rectangular, it is preferable that the two circuit elements 603 (included in the band pass filter 65), that is, the condenser 653 and the diode 644 are disposed on the positive electrode side and the remaining five circuit elements 603 (six, when the condenser of the clock circuit is included), that is, the MPU 61, coupling condensers 62, 63, memory 67, condenser 643 are properly disposed on any of the positive electrode side and the negative electrode side.

Figure 9:
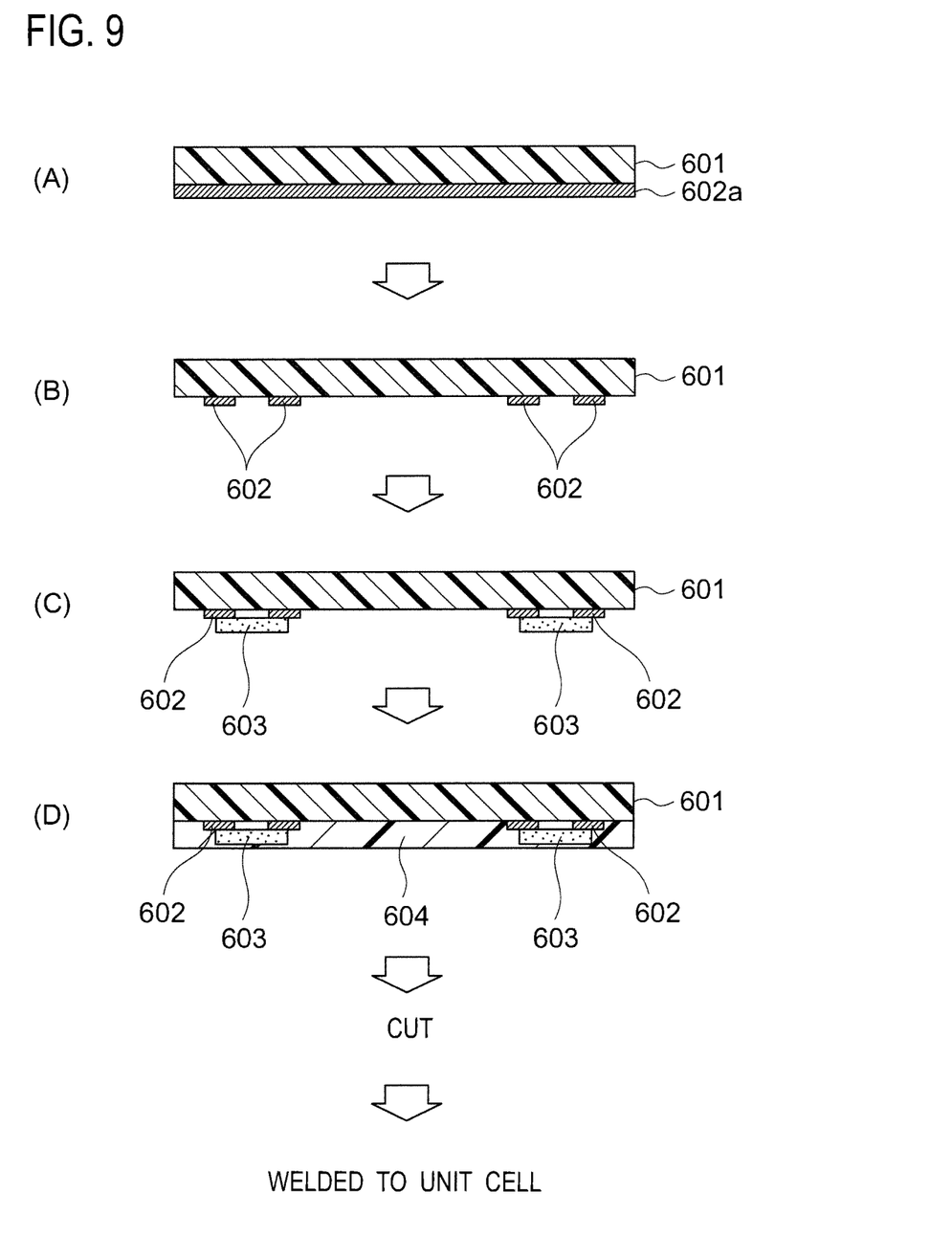
FIG. 9 is a cross sectional view showing a method producing the flexible circuit board, according to the first embodiment of the present invention.

FIG. 9A to FIG. 9D each are a cross sectional view showing the first example of a production method of the flexible circuit board 600, according to the first embodiment. The flexible circuit board 600 of the first example is made by the following operations: firstly, preparing an original sheet where a conductive foil 602a such as copper is formed on an entirety of the first main face of the insulative sheet 601 made of polyimide resin and the like, as shown in FIG. 9A; and then etching a copper foil of this original sheet by using a mask (which corresponds to the object wiring pattern) and an etching agent. With this, the wiring pattern 602 including a land for fitting the resistor and electronic parts is formed (see FIG. 9B). Ends of the board are to be joined with the positive electrode tab 112 and the negative electrode tab 113 respectively. Therefore, the copper foil are to be left at both ends of the board.

Then, by soldering and the like, the circuit elements 603 such as the IC chip (MPU 61), coupling condensers 62, 63, memory 67, condenser 653, diode 654 and the like are fitted to the land, that is, the wiring pattern 602 formed in a certain position (see FIG. 9C). Then, the insulative protective film 604 is covered from above the wiring pattern 602 and circuit elements 603 and then the insulative protective film 604 is covered on the wiring pattern 602 and circuit elements 603 through the thermal fusion bonding by means of the heat press and the like (see FIG. 9D). Since the joint portion 116 between the positive electrode tab 112 and the negative electrode tab 113 is positioned at either end of the flexible circuit board 600, the copper foil of the joint portion 116 is free from the covering with the insulative protective film 604. In the processes set forth above, as shown in FIG. 8A, a plurality of flexible circuit boards 600 are formed on one original sheet. In the next cutting process, one piece of the flexible circuit board 600 is to be obtained.

Lastly, the one piece of the cut-apart flexible circuit boards 600 is joined to the positive electrode tab 112 and negative electrode tab 113 of the above one cell 11 through an ultrasonic welding or a laser welding. In addition, with respect to the flexible circuit board 600, it is enough that only the first end portion and second end portion are respectively joined to the positive electrode tab 112 and negative electrode tab 113. In other words, it is not necessary to join a portion between the first end portion (of the flexible circuit board 600) and the second end portion (of the flexible circuit board 600) to any of the positive electrode tab 112 and negative electrode tab 113. Especially, when the assembled battery 1 is formed by stacking the cells 11, pressing a middle portion of the flexible circuit board 600 with the cell 11 can fix the middle portion of the flexible circuit board 600, in other words, joining the middle portion of the flexible circuit board 600 to the cell outer members (that is, the upper outer member 114 and lower outer member 114) is not necessary.

As set forth above, even when the assembled battery 1 is formed by stacking the cells 11 as shown in FIG. 7, using the flexible circuit board 600 according to the first embodiment increases, of the thickness of the flexible circuit board 600, only the portion other than the thickness equivalent to the circuit elements 603, thus suppressing thickness increase of the assembled battery 11. Then, the voltage detector circuit 6 is made into the flexible circuit board 600 and is integrally fitted to each cell 11. As a result, it is enough that the remaining control circuit 7 included in the monitor 5 is disposed in a space of the battery case. That is, while a large control board having an integration (aggregation) of the control circuit and voltage detection circuit was conventionally used, using the flexible circuit board 600 according to the first embodiment can omit the conventional large control board, thus making the assembled battery 1 small in size.

In addition, the circuit element 603 is disposed in the space S of the joint portion 116 of the cell 11, thereby preventing an excessive load from being applied to the circuit element 603 and preventing the upper outer member 114 and lower outer member 115 of the cell 11 from being damaged by the circuit element 603.

In addition, forming the flexible circuit board 600 rectangular is supposed to improve yield of the material of the original sheet, thereby decreasing cost.

In addition, the circuit element 603 of the band pass filter 65, that is, the condenser 653 and diode 654 are disposed in a position close to the positive electrode tab 112 for transmitting and receiving the alternating current communication signal, thereby suppressing the analogue circuit from being influenced by noise.

(Second Embodiment)

Figure 10:
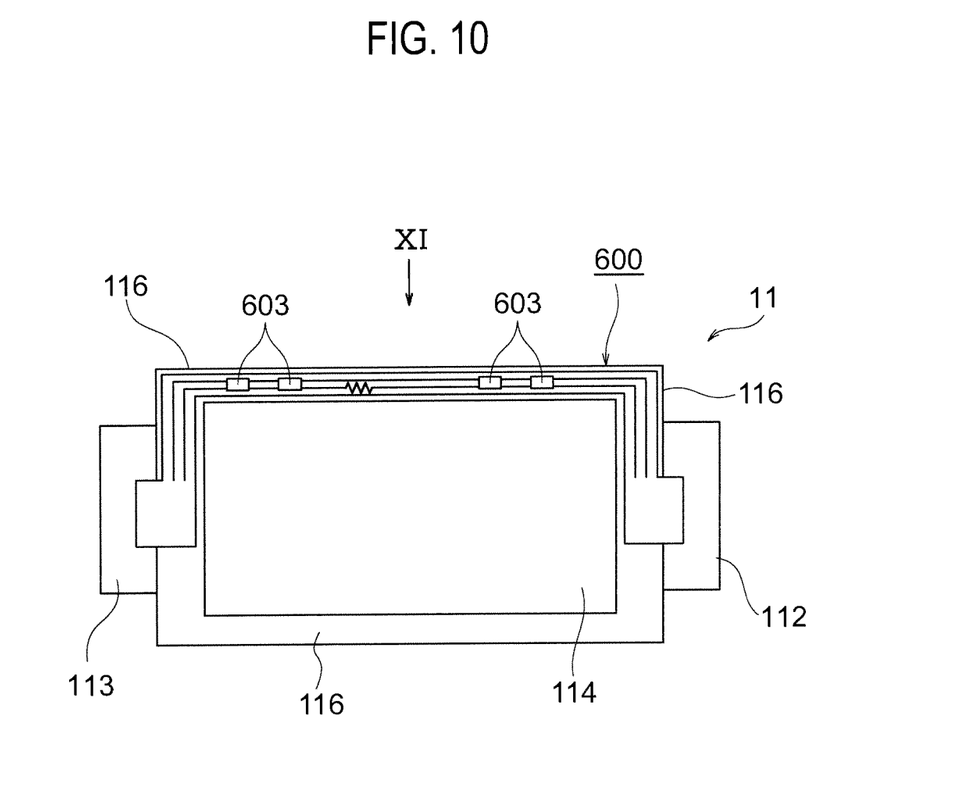
FIG. 10 is a plan view showing a cell, according to the second embodiment of the present invention.
Figure 11:
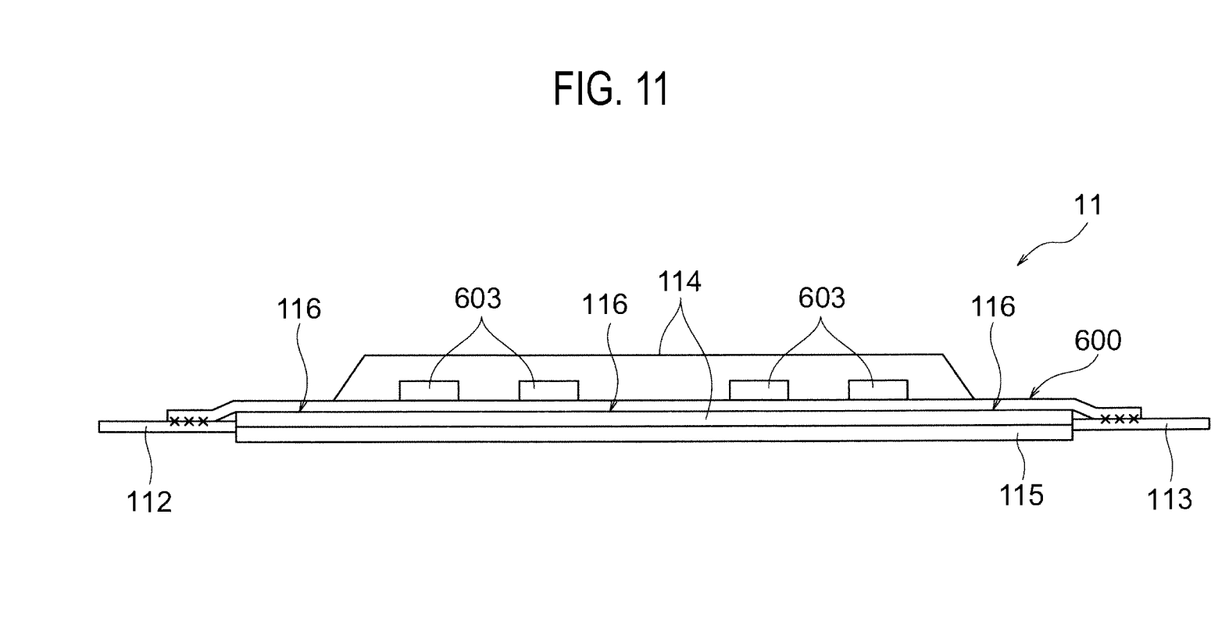
FIG. 11 is a front view showing the cell, according to the second embodiment of the present invention.

FIG. 10 is a plan view showing the cell 11, according to the second embodiment of the present invention, while FIG. 11 is a front view (viewed in the direction XI).

According to the first embodiment shown in FIG. 6, a wiring pattern portion of the flexible circuit board 600 is so fitted as to be superposed with the generator element 111 of the cell 11. On the other hand, in the flexible circuit board 600 according to the second embodiment, as shown in FIG. 10 and FIG. 11, the wiring pattern is disposed only at the joint portion 116 between the upper outer member 114 and the lower outer member 115 such that the wiring pattern portion of the flexible circuit board 600 is not superposed with the generator element 111 of the cell 11.

That is, the entirety of the flexible circuit board 600 is formed into an alphabetical C and the first end portion and the second end portion are respectively joined to the positive electrode tab 112 and the negative electrode tab 113. The wiring pattern to be formed on the flexible circuit board 600 is formed like the wiring pattern according to the first embodiment. In addition, with respect to the circuit element 603, the band pass filter 65 (condenser 653 and diode 654) is disposed on the positive electrode side as the transmitting-receiving side terminal of the alternating current communication signal.

In addition, FIG. 10 and FIG. 11 show such a layout that the circuit element 603 is disposed only at one long side (upper in FIG. 10 and FIG. 11) of the joint portion 116 between the upper outer member 114 and the lower outer member 115. However, the circuit element 603 may be disposed on any of one long side and two short sides. In addition, when the assembled battery 1 is made by stacking a plurality of cells 11, the cell 11 having the flexible circuit board 600 fitted to the upper long side in FIG. 10 and FIG. 11 and the cell 11 having the flexible circuit board 600 fitted to the lower long side in FIG. 10 and FIG. 11 may be alternately stacked, or a plurality of such cells 11 may be alternately stacked.

As set forth above, with the flexible circuit board 600 according to the second embodiment, the wring pattern portion of the flexible circuit board 600 is disposed only at the joint portion 116 in such a manner as to avoid superposing with the generator element 111 of the cell 11. Thereby, compared with the flexible circuit board 600 according to the first embodiment shown in FIG. 6, the flexible circuit board 600 according to the second embodiment does not increase the thickness of the cell 11. In addition, when the assembled battery 1 is made by stacking the cells 11, the wiring pattern portion of the flexible circuit board 600 is not subjected to the applied pressure. Therefore, the flexible circuit board 600 shown in FIG. 10 according to the second embodiment is higher in durability than the flexible circuit board 600 shown in FIG. 6 according to the first embodiment.

In addition, according to the second embodiment, the circuit element 603 can be disposed in the entire area of the flexible circuit board 600. When the assembled battery 1 is made by stacking the cells 11, the load is applied to the circuit element 603 or the flexible circuit board 600. However, disposing the circuit elements 603 in the flexible circuit board 600 in a dispersed manner can disperse the above load.

The entire contents of a prior Japanese Patent Application Laid-Open No. 2008-050849 (filed on Feb. 29, 2008 in Japan)

and a prior Japanese Patent Application Laid-Open No. 2008-050850 (filed on Feb. 29, 2008 in Japan) are incorporated herein by reference, in order to take some protection against translation errors or omitted portions.

Although the present invention has been described above according to the embodiments, the present invention is not limited to the above descriptions, and various modifications thereto or improvements thereof will occur to those skilled in the art.

[Industrial Applicability]

According to the present invention, the detection signal can be transmitted by using the power supply line, thus making it possible to monitor the cell without the need of providing a special communication-oriented signal line.

Moreover, according to the present invention, the circuit element of the detection portion is disposed at the joint portion between the battery outer members, thus making the cell's storing space small.

The invention claimed is:

1. A monitor for monitoring an assembled battery having a plurality of cells and a power supply line for connecting the plurality of the cells, the monitor comprising:
   a detecting portion for detecting a voltage of each of the cells of the plurality of the cells; and
   a controlling portion for receiving a voltage detection result detected by the detecting portion,
   wherein the detecting portion converts the voltage detection result into an alternating current communication signal and transmits the alternating current communication signal via the power supply line to the controlling portion, and the detecting portion has a communication-oriented connector connected to the power supply line via a first condenser.

2. The monitor of the assembled battery according to claim 1, wherein
   via the power supply line to the detecting portion, the controlling portion transmits the alternating current communication signal for controlling the detecting portion.

3. The monitor of the assembled battery according to claim 1, further comprising:
   a second condenser for connecting each of the detecting portions at a common potential, to thereby define a reference potential of the alternating current communication signal.

4. The monitor of the assembled battery according to claim 1,
   wherein the detecting portion further includes a first filter circuit for removing a noise from a power converter which is connected to the assembled battery.

5. The monitor of the assembled battery according to claim 1,
   wherein the detecting portion further includes a second filter circuit adapted to remove a noise from a ground fault detecting portion which is connected to the assembled battery and detects a ground fault state of the assembled battery.

6. The monitor of the assembled battery according to claim 1,
   wherein the detecting portion further includes a capacity adjusting resistor for adjusting a capacity of the cell.

7. The monitor of the assembled battery according to claim 1,
   wherein the detecting portion further includes a memory for memorizing an inherent identifier of the cell which is to be detected.

8. The monitor of the assembled battery according to claim 1, wherein
   each of the cells includes:
      a cell outer member which is formed by a first outer member and a second outer member and which seals therein a generator element, the cell outer member having a joint portion formed by joining outer peripheral end portions of the first outer member and the second outer member, and
      a pair of electrode terminals which are electrically connected with the generator element in the cell outer member and which are each led to an outer portion of the cell outer member, and
      a circuit element which is connected to one of the pair of the respective electrode terminals as to detect the voltage of the cell and which implements at least one of transmitting and receiving of the alternating current communication signal with the one of the electrode terminals is disposed at the joint portion of the cell outer member.

9. The monitor of the assembled battery according to claim 8, wherein
   the pair of the electrode terminals are respectively led out of end portions of the cell outer members, and
   a wiring pattern which connects the circuit element of the detecting portion with the pair of the electrode terminals is disposed to be superposed with the generator element.

10. The monitor of the assembled battery according to claim 8, wherein
    the pair of the electrode terminals are respectively led out of end portions of the cell outer members, and
    a wiring pattern which connects the circuit element of the detecting portion with the pair of the electrode terminals is disposed at only the joint portion to avoid a superposition with the generator element.

11. The monitor of the assembled battery according to claim 8, wherein
    the detecting portion includes a noise removing circuit element, and
    the noise removing circuit element is disposed on the electrode terminal side for implementing the at least one of the transmitting and receiving of the alternating current communication signal.

12. The monitor of the assembled battery according to claim 8, wherein
    the detecting portion includes the circuit element on a reference potential side, and
    the circuit element on the reference potential side is disposed on the electrode terminal side opposite to the electrode terminal for implementing the at least one of the transmitting and receiving of the alternating current communication signal.

13. A method for monitoring an assembled battery having a plurality of cells and a power supply line for connecting the plurality of the cells, the method comprising:
    detecting a voltage of each of the cells of the plurality of the cells; and
    receiving a voltage detection result detected by the detecting operation,
    wherein the detecting operation converts the voltage detection result into an alternating current communication signal and transmits the alternating current communication signal via the power supply line for the receiving operation, and the detecting operation has connecting a communication-oriented connector to the power supply line via a first condenser.

14. A monitor for monitoring an assembled battery having a plurality of cells and a power supplying means for connecting the plurality of the cells, the monitor comprising:
- a detecting means for detecting a voltage of each of the cells of the plurality of the cells; and
- a controlling means for receiving a voltage detection result detected by the detecting means,
- wherein the detecting means converts the voltage detection result into an alternating current communication signal and transmits the alternating current communication signal via the power supplying means to the controlling means, and the detecting means has a communication-oriented connecting means connected to the power supplying means via a first condensing means.

* * * * *